US009319595B2

(12) United States Patent
Kawarada

(10) Patent No.: US 9,319,595 B2
(45) Date of Patent: Apr. 19, 2016

(54) IMAGE CAPTURING APPARATUS AND EXPOSURE CONTROL METHOD THEREOF

(71) Applicant: CANON KABUSHIKI KAISHA, Tokyo (JP)

(72) Inventor: Masahiro Kawarada, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 13/860,254

(22) Filed: Apr. 10, 2013

(65) Prior Publication Data

US 2013/0300895 A1   Nov. 14, 2013

(30) Foreign Application Priority Data

May 9, 2012   (JP) .................................. 2012-107984

(51) Int. Cl.
H04N 5/235 (2006.01)
H04N 5/232 (2006.01)

(52) U.S. Cl.
CPC ......... H04N 5/2353 (2013.01); H04N 5/23212 (2013.01)

(58) Field of Classification Search
CPC .................................................. H04N 5/2353
USPC ...................................................... 348/229.1
See application file for complete search history.

(56) References Cited

U.S. PATENT DOCUMENTS

| 2005/0264684 A1* | 12/2005 | Kamon et al. ................ 348/362 |
| 2007/0052840 A1* | 3/2007 | Okuno ......................... 348/364 |
| 2008/0317372 A1* | 12/2008 | Kwon .................... G06T 5/008 382/263 |

FOREIGN PATENT DOCUMENTS

| JP | 10-213840 A | 8/1998 |
| JP | 2005003727 A1 | 1/2005 |
| JP | 2006023339 A | 1/2006 |
| JP | 2011150281 A | 8/2011 |
| JP | 2011232371 A | 11/2011 |
| JP | 2011234279 A | 11/2011 |

OTHER PUBLICATIONS

The above references were cited in a Oct. 30, 2015 Japanese Office Action, which is enclosed without an English Translation, that issued in Japanese Patent Application No. 2012107984.

* cited by examiner

*Primary Examiner* — Usman Khan
(74) *Attorney, Agent, or Firm* — Cowan, Liebowitz & Latman, P.C.

(57) ABSTRACT

An image capturing apparatus comprises: a sensor that photoelectrically converts incidence light and outputs an image signal; a focus control unit that performs focus control based on a contrast of the image signal corresponding to each of a plurality of focus control areas set within an image capturing area; a counting unit that detects and counts, from among the plurality of focus control areas, high luminance focus control areas indicating a luminance of at least a predetermined luminance; and an exposure control unit that performs exposure control, in a case where the counted number is a first number, so as to reduce an exposure amount of the sensor to less than when the counted number is a second number that is smaller than the first number, the exposure control being performed before the focus control by the focus control unit.

11 Claims, 4 Drawing Sheets

IMAGE CAPTURING APPARATUS AND EXPOSURE CONTROL METHOD THEREOF

BACKGROUND OF THE INVENTION

1. Field of the Invention

The present invention relates to an image capturing apparatus and a control method thereof, and more particularly to auto-focus control technology in an image capturing apparatus.

2. Description of the Related Art

Conventionally, contrast AF methods are well known as a focus detection method used in the auto-focus detection apparatus of a camera. With a contrast AF method, the high frequency component is extracted from an image signal obtained using the image sensor, a contrast evaluation value indicating a focus state is derived from the high frequency component, and the position of the focus lens is controlled so that this contrast evaluation value is maximized.

In such a contrast AF method, the following problems exist when, in the case of deriving the contrast evaluation value of a predetermined focus control area in order to bring the focus control area into focus, luminance saturation occurs in the focus control area. That is, the peak of contrast evaluation values that ought to appear at the focus position is misshapen due to the influence of luminance saturation, and focus control accuracy deteriorates.

In view of this, a focus control detection apparatus that expands the focus control area in the case where luminance saturation continues to occur in the focus control area for longer than a prescribed period has been proposed (e.g., see Japanese Patent Laid-Open No. 10-213840). By performing such expansion control, the adverse influence caused by the peak of contrast evaluation values that ought to appear at the focus position being misshapen due to the influence of luminance saturation can be reduced.

In Japanese Patent Laid-Open No. 10-213840, expansion and focus detection are performed with respect to one focus control area, although in the case of performing focus detection with a plurality of focus control areas, a configuration can be adopted in which the focus control areas adjoin one another. With such a configuration, the focus control areas cannot be expanded, and the technique of the Japanese Patent Laid-Open No. 10-213840 cannot be used.

SUMMARY OF THE INVENTION

The present invention has been made in consideration of the above situation, and suppresses a reduction in focus detection performance due to luminance saturation, when focus detection using a contrast AF method is performed with a plurality of focus control areas.

According to the present invention, provided is an image capturing apparatus comprising: a sensor that photoelectrically converts incidence light and outputs an image signal; a focus control unit that performs focus control based on a contrast of the image signal corresponding to each of a plurality of focus control areas that are set within an image capturing area; a counting unit that detects, from among the plurality of focus control areas, a high luminance focus control area indicating a luminance of at least a predetermined luminance, and counts the number of detected high luminance focus control areas; and an exposure control unit that performs exposure control, in a case where the counted number of high luminance focus control areas is a first number, so as to reduce an exposure amount of the sensor to less than when the counted number of high luminance focus control areas is a second number that is smaller than the first number, the exposure control being performed before the focus control by the focus control unit.

According to the present invention, provided is a control method of an image capturing apparatus, comprising: an image capturing step of photoelectrically converting incidence light and outputting an image signal using a sensor; a focus control step of performing focus control based on a contrast of the image signal corresponding to each of a plurality of focus control areas that are set within an image capturing area; a counting step of detecting, from among the plurality of focus control areas, a high luminance focus control area indicating a luminance of at least a predetermined luminance, and counting the number of detected high luminance focus control areas; and an exposure control step of performing exposure control, in a case where the counted number of high luminance focus control areas is a first number, so as to reduce an exposure amount of the sensor to less than when the counted number of high luminance focus control areas is a second number that is smaller than the first number, the exposure control being performed before the focus control by the focus control step.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be described in detail in accordance with the accompanying drawings.

Configuration of Digital Camera

Figure 1:
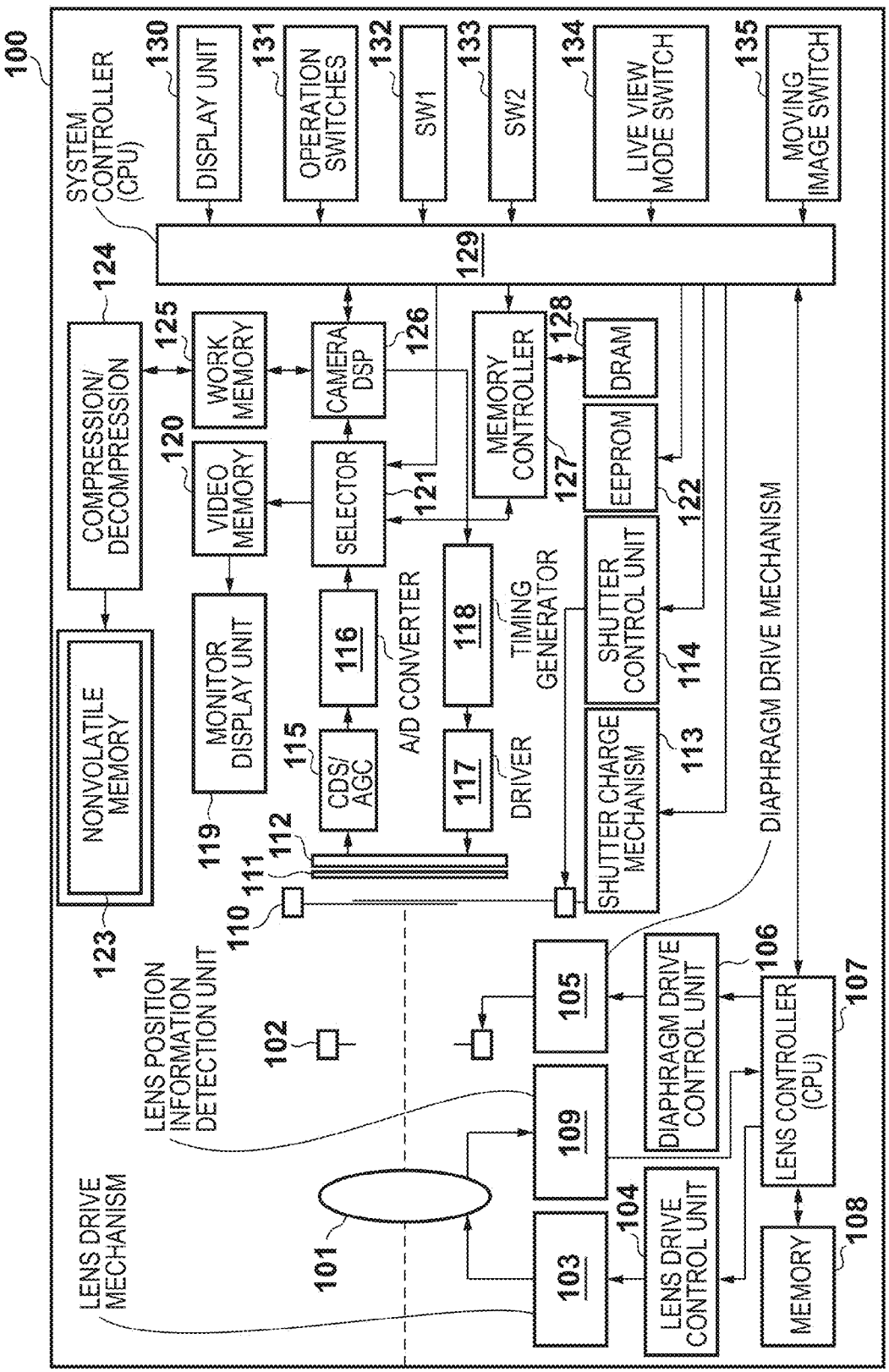
FIG. 1 is a block diagram showing a configuration of a digital camera according to an embodiment of the present invention.

FIG. 1 is a block diagram showing a configuration of the digital camera of the present embodiment. As shown in FIG. 1, the digital camera 100 has a system controller 129 that is constituted by a CPU, an MPU or the like and administers overall control, and a lens controller 107 that controls the overall optical system.

In communication between the system controller 129 and the lens controller 107, a drive command, a stop command, a drive amount and a required drive speed of a focus lens 101 for forming an image of a subject are transmitted from the system controller 129. Also, a drive amount and a drive speed of opening control of a diaphragm 102 for adjusting incident light and transmission requests for various data from the lens are transmitted from the system controller 129. Note that although only the focus lens 101 of lenses constituting the optical system is shown in FIG. 1, a plurality of lenses that are not illustrated, including a zoom lens and a fixed lens, are also provided.

At the time of focus control, the system controller 129 issues commands regarding lens drive direction, drive amount and drive speed to the lens controller 107. The lens controller 107, on receiving a lens drive command transmitted from the system controller 129, controls the lens drive mechanism 103 through a lens drive control unit 104. A lens drive mechanism 103 has a stepping motor as a drive source, and drives the focus lens 101 along an optical axis. The focus position of the focus lens 101 is sent to the lens controller 107 through a lens position information detection unit 109 constituted by a pulse encoder or the like that detects the number of rotation pulses of the motor constituting the lens drive mechanism 103, for example. The output of the lens drive mechanism 103 is connected to a hardware counter (not shown) in the lens controller 107, and position information is counted in a hardware manner when the focus lens 101 is driven. The lens controller 107, when reading the lens position, accesses a register of the internal hardware counter and reads the stored counter value.

Also, the lens controller 107, on receiving a diaphragm control command transmitted from the system controller 129, controls a diaphragm drive mechanism 105 for driving the diaphragm 102, via a diaphragm drive control unit 106, and controls the diaphragm 102 in accordance with the received drive amount.

The lens controller 107 has connected thereto a memory 108, at least a portion of which is constituted by a nonvolatile storage medium. The memory 108 has stored therein performance information such as the focal length of the zoom lens (not shown), a maximum aperture value of the diaphragm 102, and settable diaphragm drive speeds.

Incident light adjusted by the diaphragm 102 reaches an image sensor 112 via the optical filter 111, through the opening of a focal-plane shutter 110 which is a mechanical shutter. An optical filter 111 has a function of cutting out infrared rays and guiding visible light to the image sensor 112, and a function of acting as an optical low-pass filter.

The focal-plane shutter 110 is constituted by being provided with a front curtain and a rear curtain, and controls passing and shielding of incident light. The shutter control unit 114 controls the travelling operation of the front curtain and the rear curtain of the focal-plane shutter 110, according to signals from the system controller 129. The front curtain and rear curtain of the focal-plane shutter 110 each have a spring as a drive source, and require spring charge for the next operation after shutter travel. Thus, a shutter charge mechanism 113 charges the springs. Also, the system controller 129 stores, in an EEPROM 122, a program diagram defining the relationship of exposure amounts obtained from the output of a prescribed light metering area in the image sensor 112 with charge accumulation periods of the image sensor 112, exposure sensitivities and aperture values.

The image sensor 112 is controlled by the output from a driver 117 for controlling horizontal drive and vertical drive per pixel based on a signal from a timing generator 118 that determines the drive timing of the entire image capturing system. The image sensor 112 then photoelectrically converts a subject image to generate an image signal, and outputs the image signal. The image signal output from the image sensor 112 is amplified by a CDS/AGC circuit 115, and the amplified signal is converted to a digital signal by an A/D converter 116.

The digital signal output from the A/D converter 116 is output to a memory controller 127, via a selector 121 that selects an output destination based on a signal from the system controller 129. Digital signals input to the memory controller 127 are all transferred to a DRAM 128 which is a frame memory. A digital camera 100 performs finder display using a monitor display unit 119, by periodically (per frame) transferring the digital signals transferred to the DRAM 128 to a video memory 120 via the selector 121.

Apart from the system controller 129, a camera DSP 126 has connected thereto the timing generator 118, the A/D converter 116 and the video memory 120 via the selector 121, and a work memory 125.

At the time of image capture, a control signal from the system controller 129 results in the digital signals for one frame being read from the DRAM 128, image processing being performed by the camera DSP 126, and the processing result then being temporarily stored in the work memory 125. The data in the work memory 125 is then subject to data compression by a compression/decompression circuit 124 based on a prescribed compression format, and the compression result is recorded in an external nonvolatile memory 123. A removable recording medium such as a semiconductor memory card is commonly used as the nonvolatile memory 123. It is also acceptable for an arbitrary nonvolatile recording medium including a magnetic disk or an optical disk to be used as the nonvolatile memory 123.

Operation switches 131 connected to the system controller 129 are a group of input devices for a user to perform operation inputs with respect to various setting items of the digital camera 100, and include arbitrary input devices. A display unit 130 is a display unit such as a liquid crystal panel, a light-emitting diode (LED) or an organic EL panel, and displays the operating state of the digital camera 100 that is set or selected using switches included among the operation switches 131.

A release switch SW1 (132) is turned on when an internal two-stage release button is half-pressed (pressed down one stage), and as a result of the release switch SW1 being turned on, the system controller 129 starts image capture preparation operations such as light metering, focus detection, and the like. A release switch SW2 (133) is turned on when the release button is fully pressed (pressed down two stages), and as a result of the release switch SW2 being turned on, image capture operations (charge accumulation and charge readout operations) for recording a still image are started.

A live view mode switch 134 is a switch for performing on/off control of finder display (live view) on the monitor display unit 119. A moving image switch 135 is a switch for starting an operation for repeatedly accumulating and reading electric charge, in order to acquire a moving image. Although the digital camera 100 is set to record still images (hereinafter, "still image mode") as the default setting when powered on, operating the moving image switch 135 changes the settings to record moving images (hereinafter, "moving image mode"). When the moving image switch 135 is again operated in the moving image mode, the settings return to the still image mode.

Figure 2:
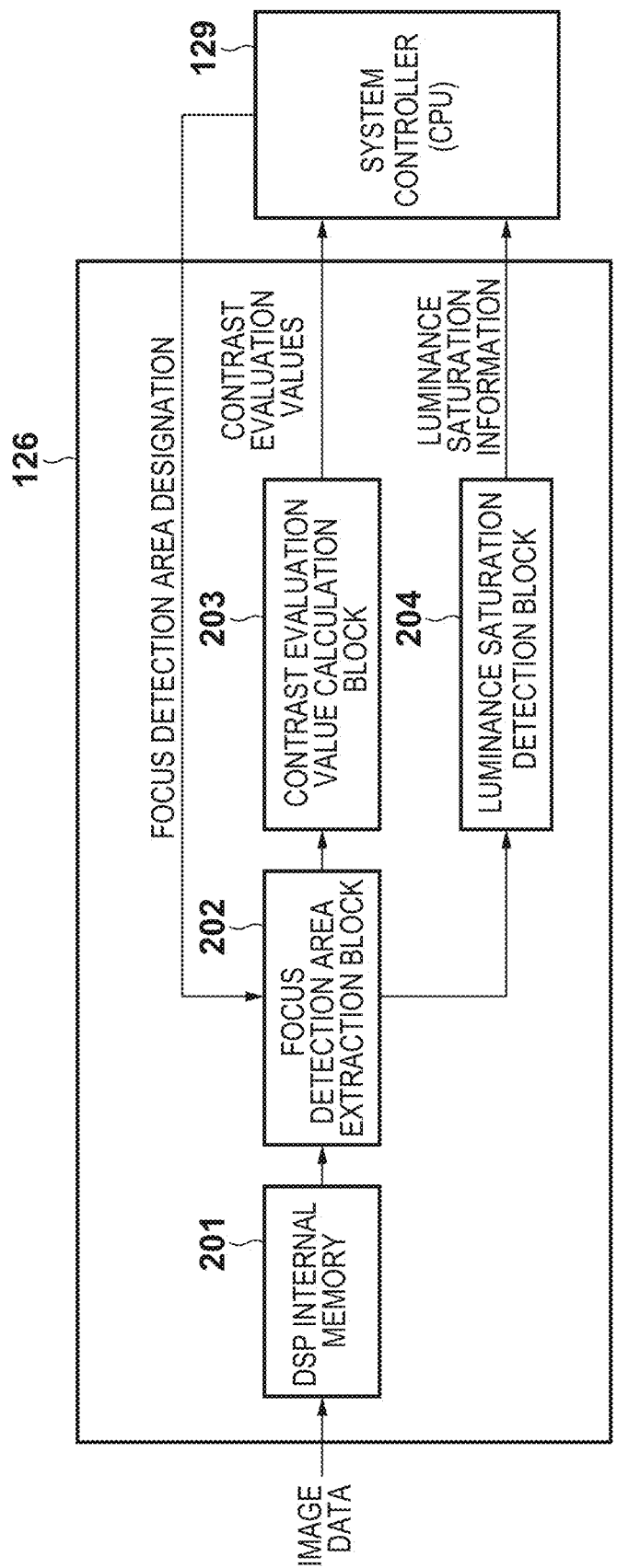
FIG. 2 is a block diagram showing a functional configuration of a camera DSP according to the embodiment of the present invention.

Next, a functional configuration of the camera DSP 126 will be described using FIG. 2. The image signal generated by the image sensor 112 is amplified by the CDS/AGC circuit 115, converted into a digital signal by the A/D converter 116, and input to the camera DSP 126 via the selector 121 as mentioned above. The camera DSP 126 performs calculation of a contrast evaluation value that is used in contrast AF, face detection, and calculation of a defocus amount that is used in phase difference AF on the image capturing surface.

In order to calculate a contrast evaluation value, the image signal input to the camera DSP 126 is first input to a focus detection area extraction block 202 via a DSP internal memory 201 in the camera DSP 126. The focus detection area extraction block 202 extracts an image of the focus detection area and the vicinity thereof from the image signals for a full screen, and supplies the extracted image to a contrast evaluation value calculation block 203. The size of one focus detection area desirably is about ⅕ to ⅒ the size of the full screen. Note that a configuration is adopted such that the position and size of the focus detection area on a screen can be set in the focus detection area extraction block 202 by the system controller 129. The contrast evaluation value calculation block 203 extracts a prescribed frequency component by performing digital filtering on the image of the focus detection area and the vicinity thereof, and outputs the extracted frequency component to the system controller 129 as the contrast evaluation value of the focus detection area. A luminance saturation detection block 204 detects whether the number of image signals having a high luminance of at least a prescribed luminance determined as indicating luminance saturation that are included in the focus detection area extracted by the focus detection area extraction block 202 is greater than or equal to a prescribed number of pixels. The detection result is output to the system controller 129 as luminance saturation information.

Operations of Digital Camera

Next, the operating modes of the digital camera 100 will be described. In the present embodiment, it is assumed that the digital camera 100 is provided with two operating modes for focus detection. The first is a "one-point AF mode" in which focus detection is performed on one focus detection area provided within the image capturing area of the image sensor 112. The second is a "multi-point AF mode" in which focus detection is performed after automatically selecting an area to be subject to focus detection based on a prescribed detection priority order with respect to a plurality of focus detection areas provided within the image capturing area of the image sensor 112. The operating mode for focus detection is changed by operation input through the operation switches 131. Hereinafter, these two AF modes will be described using FIG. 3 and FIG. 4.

Figure 3:
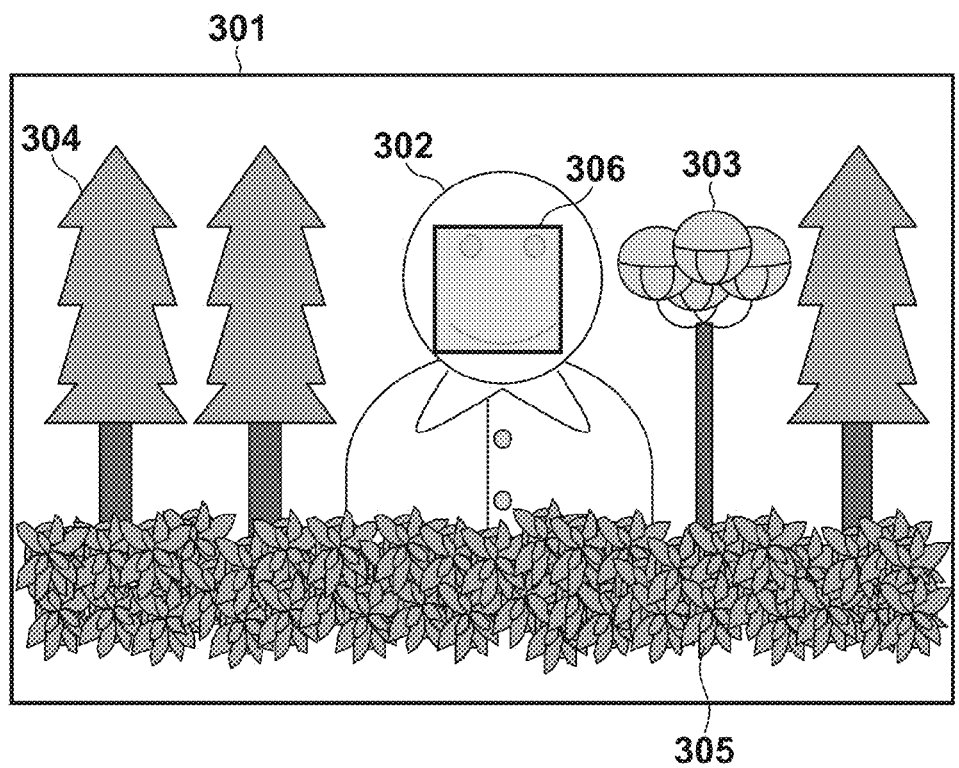
FIG. 3 is a schematic diagram showing a focus detection area in a one-point AF mode according to the embodiment of the present invention.

FIG. 3 is a schematic diagram showing a focus detection area in the one-point AF mode. In FIG. 3, a shot composition 301 includes a person 302 serving as the main subject, an illuminated street light 303, trees 304 in the background, a hedge 305 in the foreground, and a focus detection area 306 set in the vicinity of the person's face. In the one-point AF mode, the focus detection area 306 can be moved within the limits of the shot composition 301 by operation input through the operation switches 131. In FIG. 3, the focus detection area 306 is set on the face of the person 302. After the digital camera 100 has been powered on and the live view operation of capturing an image of the subject and displaying the image capturing result on the display unit 130 has started, focus detection is performed on the focus detection area 306 through the SW1 (131) being pressed.

Figure 4:
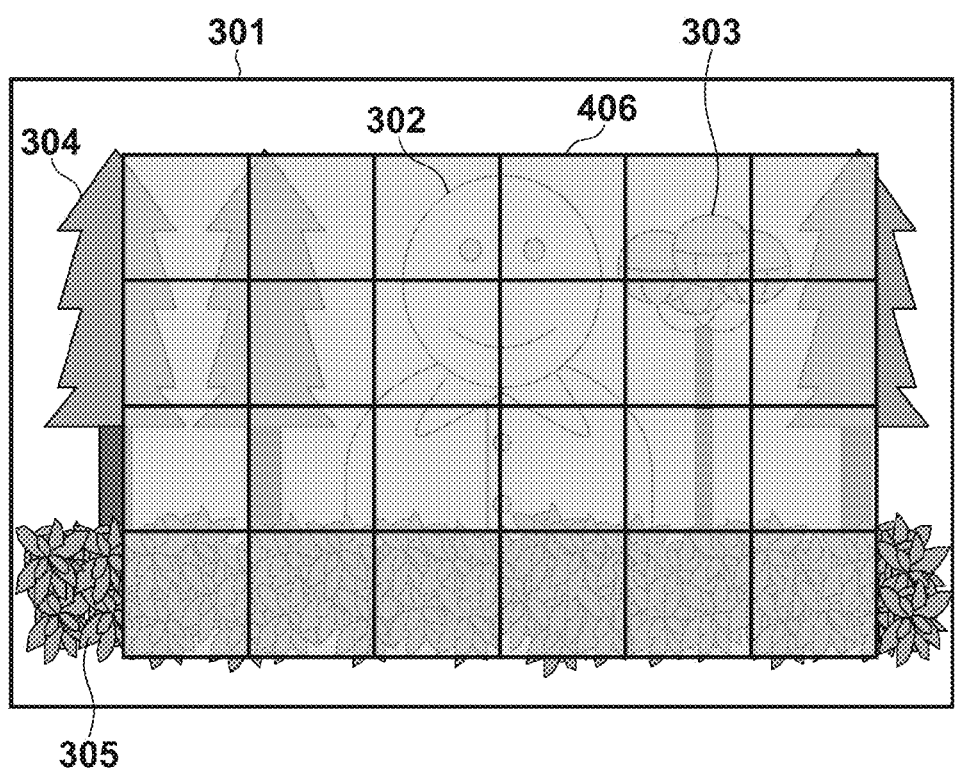
FIG. 4 is a schematic diagram showing focus detection areas in a multi-point AF mode according to the embodiment of the present invention.

FIG. 4 is a schematic diagram showing focus detection areas in the multi-point AF mode. In FIG. 4, the same shot composition 301 as FIG. 3 is shown, but instead of the focus detection area 306, the shot composition 301 includes multi-point focus detection areas 406 enabling independent focus detection on a total of 24 areas consisting of six horizontal areas and four vertical areas. The multi-point AF mode is a mode in which the focus detection area cannot be arbitrarily moved by operation input, unlike the one-point AF mode, and the focus detection area that is ultimately focused on is decided by the focus detection operation of the digital camera 100. In FIG. 4, objects from the person 302 to part of the hedge 305 are included in the plurality of multi-point focus detection areas 406. After the digital camera 100 has been powered on and the live view operation of capturing an image of the subject and displaying the image capturing result on the display unit 130 has started, focus detection in the multi-point AF mode is performed on the 24 areas in total consisting of six horizontal areas and four vertical areas through the SW1 (131) being pressed.

Figure 5:
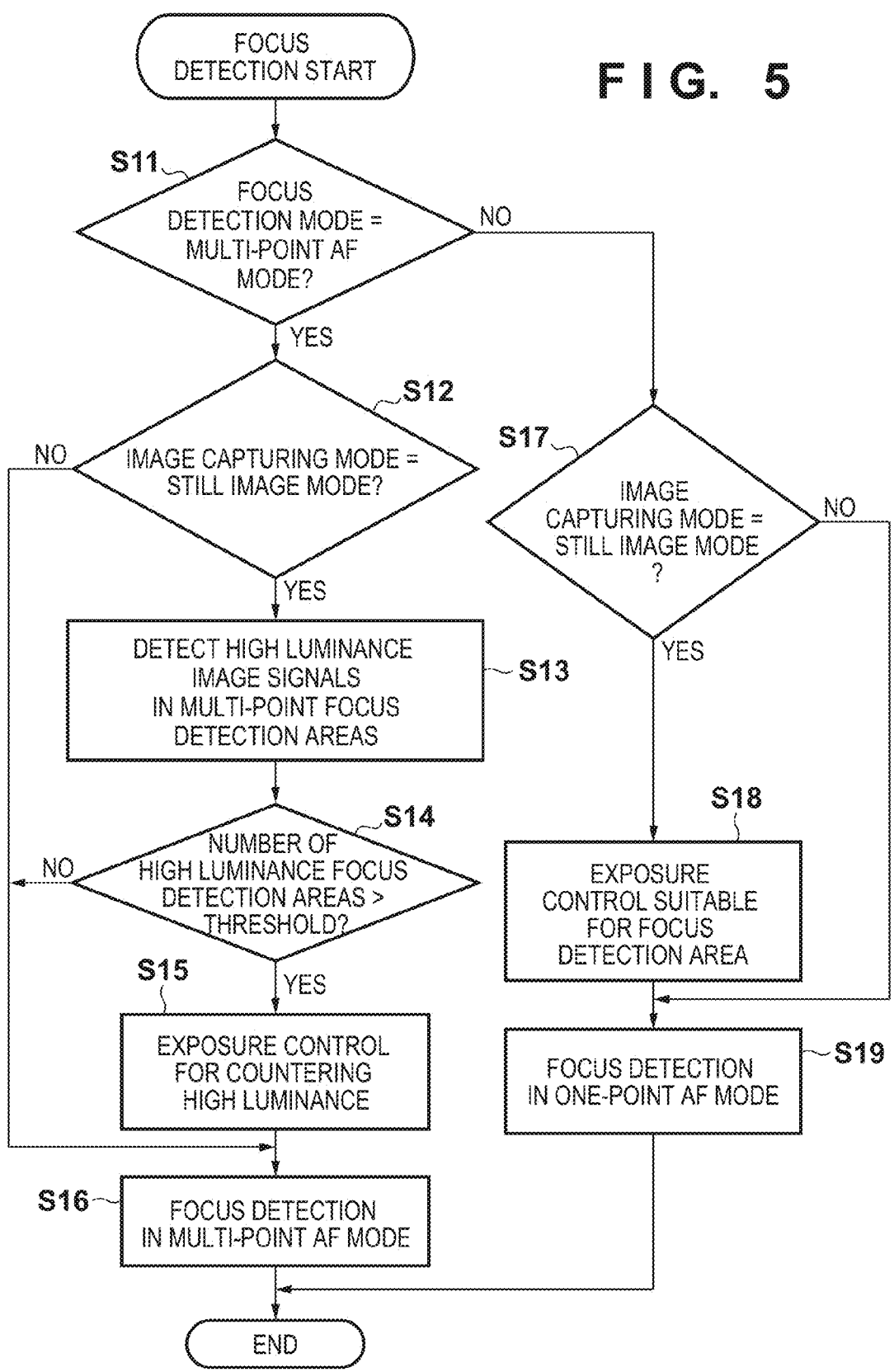
FIG. 5 is a flowchart that shows a focus detection operation according to the embodiment of the present invention.

Next, the focus detection operation in the present embodiment will be described using the flowchart of FIG. 5. Note that controls described below are performed by the system controller 129, unless particularly stated otherwise.

First, the release switch SW1 (132) is operated, and processing is started by a focus detection command being issued. Note that it is assumed that the digital camera 100 has already been powered on, and that image capture and display of around 30 fps to 60 fps is started following the issuance of a live view command.

First, at step S11, it is determined whether the focus detection mode is the multi-point AF mode. If the focus detection mode is the multi-point AF mode, the processing advances to step S12, and if the focus detection mode is the one-point AF mode, the processing advances to step S17.

At step S12, it is determined whether the image capturing mode is the still image mode by operation of the moving image switch 135. If the image capturing mode is the still image mode, the processing advances to step S13, in order to perform processing for determining whether exposure control for countering high luminance is necessary. If the image capturing mode is the moving image mode, the processing advances to step S16, after bypassing exposure control for countering high luminance, since it is desirable to give preference to moving image recording quality and not perform exposure control for focus detection.

At step S13, high luminance multi-point focus detection areas including at least a predetermined number of high luminance image signals whose luminance is greater than or equal to a predetermined luminance are detected from among the 24 multi-point focus detection areas 406 in total consisting of six horizontal areas and four vertical areas shown in FIG. 4, and the processing advances to step S14. At step S14, the number of high luminance multi-point focus detection areas detected at step S13 is counted, and it is determined whether the counted number is greater than a prescribed threshold. If the number of high luminance multi-point focus detection areas exceeds the threshold, the processing advances to step S15, in order to perform exposure control for countering high luminance. If the number of high luminance multi-point focus detection areas is less than or equal to the threshold, the processing advances to step S16. Here, setting the prescribed threshold to a low value will result in the exposure control for countering high luminance of step S15 discussed later being performed even when only a small number of high luminance areas are included in the area of the shot composition. Conversely, setting the prescribed threshold to a high value will result in the exposure control for countering high luminance of step S15 discussed later not being performed until the number of high luminance areas included in the shot composition is extensive. Thus, the prescribed threshold desirably is defined to be about half the number of multi-point focus detection areas, for example. At step S15, because high luminance is detected in a greater number of multi-point focus detection areas than the prescribed threshold, the exposure amount is reduced.

Here, the range within which exposure control can be changed will be described. In the multi-point AF mode, subjects having various exposure conditions may possibly coexist in the focus detection areas. In other word, even though certain multi-point focus detection areas may include high luminance signals, other areas may be underexposed. At this time, underexposure due to taking only the high luminance image signals included in the focus detection areas into consideration results in other areas that were underexposed to begin with being further underexposed, leading to deterioration of focus detection accuracy or an inability to perform focus detection in those areas. Therefore, it is desirable to restrain control that results in underexposure due to the presence of high luminance image signals to a range (so-called dynamic range) within which the linearity of photoelectric conversion by the image sensor 112 is maintained. In terms of the specific operations of the digital camera 100, the amount of exposure change when reducing the exposure amount at step S15 is provided with an upper limit, thereby ensuring that exposure control does not reduce the exposure amount by more than a prescribed amount of exposure change. After performing the abovementioned exposure control for countering high luminance, the processing advances to step S16.

At step S16, contrast evaluation is performed in each of the multi-point focus detection areas 406 while changing the focus position of the lens 101, and a focusing operation is performed on the multi-point focus detection area in which the peak of contrast evaluation values is located nearest (hereinafter, "nearest focusing area"). Also, other multi-point focus detection areas having a focused position within the depth of field of the focused position of the nearest focused area (hereinafter, "focused areas within the depth of field") are detected. After the focusing operation, a graphic indicating "focused" is displayed in relation to the nearest focused area and the focused areas within the depth of field by being superimposed on the live view display that is being displayed on the display unit 130.

On the other hand, if the operating mode is not the multi-point AF mode, that is, if the operating mode is the one-point AF mode, in step S17, it is determined whether the image capturing mode is the still image mode by operation of the moving image switch 135. If the image capturing mode is the still image mode, the processing advances to step S18, in order to perform optimal exposure control for the one-point focus detection area 306. On the other hand, if the image capturing mode is the moving image mode, the processing advances to step S19, after bypassing optimal exposure control for the focus detection area 306, since it is desirable to give preference to moving image recording quality and not perform exposure control for focus detection as mentioned above.

After performing exposure control so as to achieve an exposure amount suitable for the focus detection area 306 at step S18, the processing advances to step S19. For example, exposure control is performed so that the luminance of the focus detection area 306 falls within a predetermined luminance range. At step S19, contrast evaluation is performed in the one-point focus detection area 306 while changing the focus position of the focus lens 101, and the focus lens 101 is controlled to be at a focused position.

According to the present embodiment as describe above, when performing focus detection using a contrast AF method, deterioration of focus detection performance can be suppressed, even when high luminance image signals are included in the focus control areas.

Variations

In the abovementioned embodiment, inclusion of high luminance image signals is detected at step S13, the number of multi-point focus detection areas that include high luminance image signals is counted at step S14, and, if the counted number is greater than a prescribed threshold, exposure control for countering high luminance is performed at step S15.

In this variation, the number of multi-point focus detection areas in a low luminance state is further calculated, and if the counted number is greater than or equal to a prescribed number, exposure control for increasing the exposure amount is additionally performed at step S15 as a low luminance countermeasure. Here, for example, the average luminance value of the image signals of each multi-point focus detection area is derived, multi-point focus detection areas whose derived average luminance value is lower than a predetermined luminance are detected, and the number of detected multi-point focus detection areas is counted. By adopting such a configuration, it is further possible to suppress deterioration of focus detection performance in a low luminance state.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-107984, filed on May 9, 2012 which is hereby incorporated by reference herein in its entirety.

What is claimed is:

1. An image capturing apparatus comprising:
a sensor that photoelectrically converts incidence light and outputs an image signal; and
a controller comprising:
a setting unit that sets a plurality of focus areas within an image capturing area, wherein a contrast signal and a luminance signal are both acquired from each of the focus areas;
a focus control unit that performs focus control based on the contrast signal;
a counting unit that detects, from among the plurality of focus areas, a high luminance focus area indicating, based on the luminance signal, a high luminance characteristic which is higher than a predetermined luminance characteristic, and counts the number of detected high luminance focus areas; and
an exposure control unit that performs exposure control, in a case where the counted number of high luminance focus areas is greater than a predetermined threshold value, so as to reduce an exposure amount of the sensor, and in a case where the counted number of high luminance focus area is not greater than the threshold value, so as to keep an exposure amount of the sensor, wherein the exposure control being performed before the focus control by the focus control unit.

2. The image capturing apparatus according to claim 1, wherein the exposure control unit performs exposure control so as to reduce the exposure amount of the sensor in the case where the counted number of high luminance focus areas exceeds a predetermined threshold.

3. The image capturing apparatus according to claim 1, wherein the exposure control unit performs exposure control so as to increase the exposure amount of the sensor that has been reduced, after acquisition of a contrast evaluation value for the focus control.

4. The image capturing apparatus according to claim 1, wherein the counting unit detects, from among the plurality of focus areas, a high luminance focus area that includes more than a predetermined number of image signals indicating a luminance characteristic of at least a predetermined luminance characteristic, and counts the number of detected high luminance focus areas.

5. The image capturing apparatus according to claim 1, wherein the image capturing apparatus has a first mode in which a still image is captured, the exposure control unit, in the first mode, performs exposure control, in the case where the counted number of high luminance focus areas is greater than the threshold value, so as to reduce the exposure amount of the sensor to less than when the counted number of high luminance focus areas is not greater than the threshold value, and in a second mode that is different from the first mode, in the case where the counted number of high luminance focus areas is greater than the threshold value, does not perform control for reducing the exposure amount of the sensor relative to when the counted number of high luminance focus areas is not greater than the first threshold value.

6. The image capturing apparatus according to claim 1, wherein the counting unit further detects, from among the plurality of the focus areas, a low luminance focus area in which an average luminance characteristic of image signals included in the focus area is lower than a predetermined luminance characteristic, and counts the number of detected low luminance focus areas, and the exposure control unit performs exposure control so as to increase the exposure amount of the sensor in a case where the counted number of low luminance focus areas exceeds a predetermined threshold.

7. The image capturing apparatus according to claim 1, wherein the image capturing apparatus has a still image mode in which a still image is captured, and a moving image mode in which a moving image is captured, and the image capturing apparatus further comprises a control unit that performs control so that operations performed by the counting unit and the exposure control unit are not performed, in a case of performing image capture using the sensor in the moving image mode.

8. The image capturing apparatus according to claim 6, wherein the predetermined threshold is half the number of focus areas.

9. The image capturing apparatus according to claim 1, wherein the exposure control unit performs exposure control so as to reduce the exposure amount in a range within which linearity is maintained in the photoelectric conversion performed by the sensor.

10. The image capturing apparatus according to claim 1, wherein the image capturing apparatus has a multi-point AF mode in which focus control is performed based on a contrast of the plurality of focus areas that are set within the image capturing area of the sensor, and a one-point AF mode in which focus control is performed based on a contrast of one focus area that is set within the image capturing area of the sensor, and in a case where the one-point AF mode is set, the operation by the counting unit is not performed, and the exposure control unit performs exposure control so that the luminance characteristic of the set one focus area is within a predetermined range.

11. A control method of an image capturing apparatus, comprising:

an image capturing step of photoelectrically converting incidence light and outputting an image signal using a sensor;

a focus control step of performing focus control based on a contrast of the image signal corresponding to each of a plurality of focus areas that are set within an image capturing area;

a setting step of setting a plurality of focus areas within an image capturing area, wherein a contrast signal and a luminance signal are both output from each of the focus areas;

a counting step of detecting, from among the plurality of focus areas, a high luminance focus area indicating a luminance characteristic which is higher than a predetermined luminance characteristic, and counting the number of detected high luminance focus areas; and an exposure control step of performing exposure control, in a case where the counted number of high luminance focus areas is greater than a predetermined threshold value, so as to reduce an exposure amount of the sensor, and in a case where the counted number of high luminance focus area is not greater than the threshold value, so as to keep an exposure amount of the sensor, wherein the exposure control being performed before the focus control by the focus control step.

* * * * *